United States Patent [19]
Deeks

[11] 3,730,200
[45] May 1, 1973

[54] GAS VENT

[75] Inventor: Ronald G. Deeks, Oakville, Ontario, Canada

[73] Assignee: Procor Limited, Chicago, Ill.

[22] Filed: Apr. 1, 1971

[21] Appl. No.: 130,423

[52] U.S. Cl. ................................ 137/1, 137/340
[51] Int. Cl. ................................ F16l 53/00
[58] Field of Search ................ 137/1, 340, 334, 137/13

[56] References Cited

UNITED STATES PATENTS

| | | | |
|---|---|---|---|
| 1,699,527 | 1/1929 | Folmshee | 137/340 X |
| 1,685,131 | 9/1928 | Hummer | 137/340 X |
| 2,980,172 | 4/1961 | Thompson | 137/340 X |
| 1,602,887 | 10/1926 | Florez | 137/340 X |

*Primary Examiner*—Alan Cohan
*Attorney*—Charles M. Kaplan and Joel E. Siegel

[57] ABSTRACT

A method and apparatus for venting hydrogen sulphide gas from a vessel or tank car containing hot molten sulphur therein, wherein a layer of sulphur crust has formed on the upper surface thereof and conventional venting arrangements are non-functional due to blocking by solidified sulphur. A hot fluid is passed through a conduit so as to melt a hole in the sulphur crust around the outer periphery of the conduit and thus permit trapped hydrogen sulphide gas from the area below the crust to pass upward therethrough. The hydrogen sulphide gas is then vented from the area above the crust to the outside of the vessel.

2 Claims, 2 Drawing Figures

Patented May 1, 1973  3,730,200
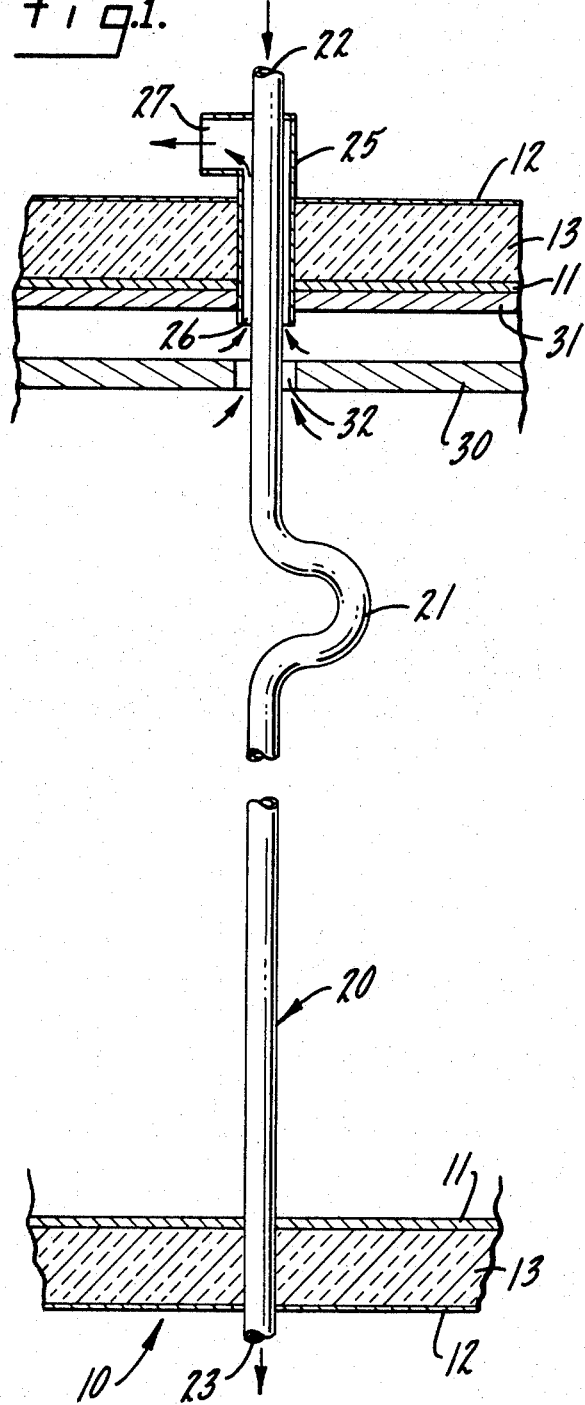
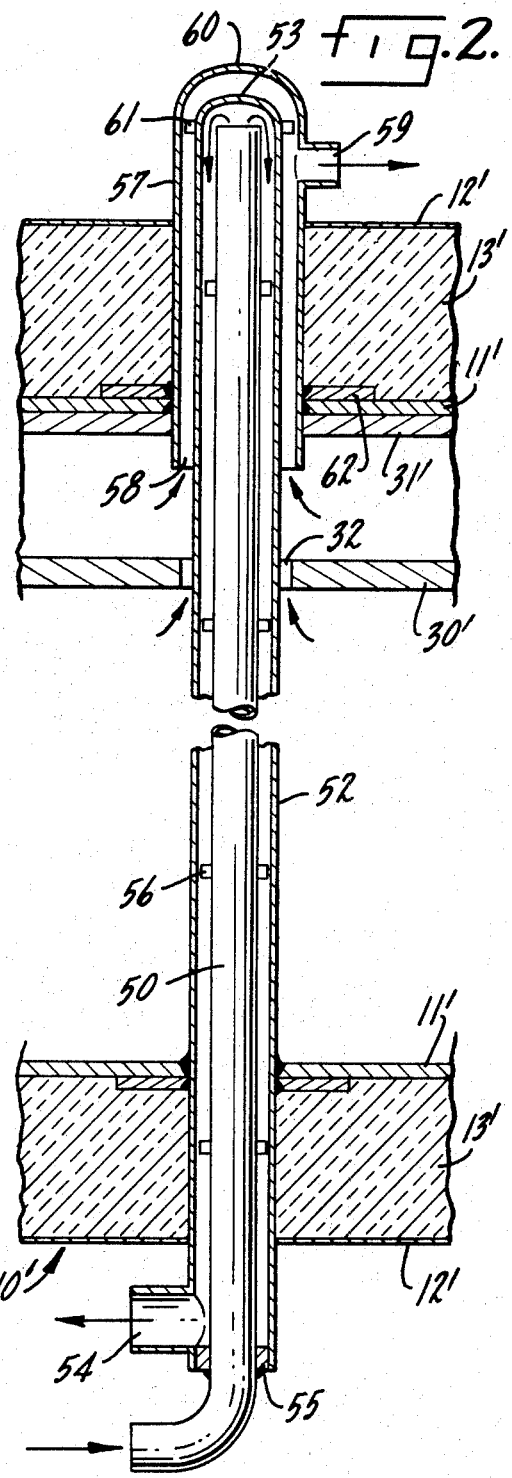
INVENTOR.
Ronald G. Deeks
BY Joel E. Siegel
Attorney.

3,730,200

GAS VENT

BACKGROUND OF THE INVENTION

The present invention relates to a method and apparatus for unloading a molten product from a vessel or tank car and more particularly to a method and apparatus for venting hydrogen sulphide gas from a vessel or tank car containing hot molten sulphur therein, wherein a layer of sulphur crust has formed on the upper surface thereof and conventional venting arrangements are non-functional due to blocking by solidified sulphur.

It is conventional to transport hot molten sulphur in an insulated railroad tank car. The car is loaded with the hot molten sulphur which contains hydrogen sulphide gas in solution therein. As the sulphur cools in transit, the hydrogen sulphide gas is released and accumulates between the shell of the car and the crust which forms on the top surface of the sulphur. There is also a quantity of hydrogen sulphide gas trapped below the crust in the sulphur that remains liquid. The problem associated with this accumulation of hydrogen sulphide is that when the manway cover of the car is opened hydrogen sulphide is released therethrough and there have been cases of men being overcome by the gas and falling from the car. In addition, if the crust adjacent to the manway has become perforated, there is a risk of the pressure of the hydrogen sulphide gas trapped below the crust causing molten sulphur to be blown up through the perforation.

SUMMARY OF THE INVENTION

The primary object of the present invention is to provide a method and apparatus for unloading molten sulphur from a vessel or tank car that eliminates the danger of workmen being overcome by exiting hydrogen sulphide gas.

Another object is to provide a method and apparatus for venting hydrogen sulphide gas from a vessel containing hot molten sulphur therein, wherein a layer of sulphur crust has formed on the top surface thereof and conventional venting arrangements are blocked.

A further object is to provide an apparatus for venting hydrogen sulphide gas from a vessel containing hot molten sulphur therein, which allows air to enter the vessel to permit unloading without having to open the manway cover.

The present invention provides a steam pipe passing through the sulphur crust adapted to receive steam therethrough. When the steam is passed through the pipe a hole is melted through the sulphur crust around the outer periphery of the pipe and solidified sulphur blocking the vent is melted. The hydrogen sulphide trapped below the crust rises through the hole and is removed along with the gas above the crust through a vent communicating with the outside of the vessel. The vent also allows air to enter the vessel to permit the vessel to be unloaded without opening the manway.

Other objects and features of the invention will become apparent to those skilled in the art as the disclosure is made in the following description of a preferred embodiment of the invention, as illustrated in the accompanying drawings, in which:

DESCRIPTION OF THE DRAWINGS

FIG. 1 is a side elevational view, partially in section, illustrating a first preferred embodiment of the present invention; and FIG. 2 is a side elevational view, partially in section, illustrating a second preferred embodiment of the present invention.

DESCRIPTION OF A PREFERRED EMBODIMENT

The present invention provides a method for unloading molten sulphur from a vessel or tank car comprising the following steps:

1. Passing a hot fluid (i.e. steam) through a conduit passing through the crust formed on the top surface of the sulphur so as to melt a hole in the crust about the outer periphery of the conduit and to melt any sulphur which may have solidified between the conduit and the vent, thus permitting trapped hydrogen sulphide gas to pass therethrough.

2. Venting the hydrogen sulphide gas and other gases contained within the area above the crust through a conduit having a first end in fluid communication with the area above the crust and a second end in fluid communication with the outside of the vessel.

3. Applying a source of heat to the main coils to heat the sulphur while the second end of the vent conduit is in fluid communication with the atmosphere.

4. Unloading the sulphur through an unloading valve positioned on the bottom of the vessel. The operation of the above described method will hereinafter become more apparent during the description of two preferred apparatus embodiments which may be used to carry out the above mentioned method steps.

Referring to FIG. 1, a portion of an insulated railroad tank car 10, of the type employed to transport molten sulphur, is illustrated having an inner tank shell 11, an outer jacket 12, and insulation material 13 positioned therebetween. Although not illustrated a conventional main heat coil is positioned outside of or within the tank to receive steam from a source outside the car so as to heat the sulphur within the car.

The present invention provides a steam pipe 20 passing through the car from top to bottom. Since, during transit oil canning or ovalling of the shell occurs, an anti compression loop 21 is incorporated in pipe 20. Top portion 22 of pipe 20 is connected to a source of steam and a control valve (not shown) to permit a selective supply of steam through pipe 20. Bottom portion 23 of pipe 20 is trapped and since the steam passes straight down through the pipe, no condensate blockage occurs. An elbow vent pipe 25, located at the top of tank 11 and jacket 12, is concentric with a portion of pipe 20 and has a first end 26 in fluid communication with the interior of car 10 and a second end 27 in fluid communication with exterior of car 10. Vent 25 permits fluid communication between the upper portion of car 10 and the atmosphere.

In operation, as the sulphur within the car cools in transit a sulphur crust 30 forms on the top surface of the sulphur and a splash crust 31 forms on the tank shell 11. Invariably sulphur also solidifies between vent pipe 25 and pipe 20 effectively blocking the vent to atmosphere and trapping hydrogen sulphide gas between crusts 30 and 31. Upon reaching the unloading destination steam is passed downwardly through pipe 20 melting the sulphur between vent pipe 25 and pipe 20. The hydrogen sulphide gas trapped between crust 30 and crust 31 is thus released and exits through vent pipe 25 to atmosphere. At the same time a hole 32 is melted in crust 30 and hydrogen sulphide gas trapped below crust 30 is released through hole 32 into the area between crusts 30 and 31 and then exits through vent pipe 25, as indicated by arrows in FIG. 1. A period of from twenty to thirty minutes is usually sufficient to clear the car of hydrogen sulphide. Steam is then directed through the main coils, as well as pipe 20, to raise the temperature of the whole load of sulphur. When the sulphur is at a suitable temperature for unloading to commence, the bottom unloading valve is opened. As the sulphur flows out of the unloading valve air enters through vent 25 to permit gravity unloading of the car without opening the manway.

Referring to FIG. 2, an alternative embodiment is illustrated in conjunction with a tank car 10'. Car 10' includes an inner tank shell 11', an outer jacket 12', and insulation material 13' positioned therebetween. Although not illustrated a conventional main heat coil is positioned outside of or within the tank to receive steam from a source outside the car so as to heat the sulphur within the car.

An inlet steam pipe 50 passing through the car from top to bottom is encased by an outlet steam pipe 52 having a capped upper end 53. Steam entering the bottom of pipe 50 passes upward therethrough into the upper end 53 of pipe 52 and then downward through pipe 52 and out lower end 54, as indicated by arrows in FIG. 2. Inlet pipe 50 is fixed to the bottom of outlet pipe 52 at 55 in any conventional manner and is centered within pipe 52 by pipe guides 56 which allow for freedom of differential expansion between the two pipes. The upper end 53 of pipe 52 is encased with a gas venting pipe 57 which has a first open end 58 just inside tank shell 11' and a second open end 59 outside jacket 12'. Vent pipe 57 has capped upper end 60 concentric with upper end 53 of pipe 52. The top part of pipe 52 is centered within vent pipe 57 by pipe guides 61, which allow for differential expansion to take place between the top part and bottom part of tank shell 11'. Vent pipe 57 is connected to tank shell 11' in a conventional manner, as by being welded to reinforcement plate 62 which is in turn welded to tank shell 11'.

The operation of this embodiment in many respects is similar to the operation of the embodiment illustrated in FIG. 1. Upon reaching the unloading destination steam is passed upward through pipe 50 and then down through pipe 52 melting the solidified sulphur between vent pipe 57 and outlet steam pipe 52. The hydrogen sulphide gas trapped between crust 30' and crust 31' is thus released and exits through vent pipe 57 to atmosphere. At the same time a hole 32' is melted in crust 30' and the hydrogen sulphide gas trapped below crust 30' is released through hole 32' into the area between crusts 30' and 31' and then exits through vent pipe 57, as indicated by arrows in FIG. 2. A period of from twenty to thirty minutes is usually sufficient to clear the car of hydrogen sulphide. Steam is then directed through the main coils, as well as pipes 50 and 52, to raise the temperature of the whole load of sulphur. When the sulphur is at a suitable temperature for unloading to commence, the bottom unloading valve is opened. As the sulphur flows out of the unloading valve, air enters through vent 57 to permit gravity unloading of the car without opening the manway.

Various modifications are contemplated and may obviously be resorted to by those skilled in the art without departing from the spirit and scope of the invention, as hereinafter defined by the appended claims, as only a preferred embodiment thereof has been disclosed.

What is claimed:

1. A method for venting hydrogen sulphide gas from a vessel containing hot molten sulphur, wherein a layer of sulphur crust has formed on the top surface thereof, comprising the steps of:
   a. passing a hot fluid through a conduit passing through the sulphur crust so as to melt a hole in said crust around the outer periphery of said conduit so as to permit trapped hydrogen sulphide gas to pass upward therethrough; and
   b. venting the hydrogen sulphide gas from the area above said crust by a conduit having one end in fluid communication with said area above said crust and the other end in fluid communication with the outside of said vessel.

2. A method for unloading molten sulphur from a vessel, wherein a layer of sulphur crust has formed on the top surface of the molten sulphur, comprising the steps of:
   a. passing a hot fluid through a conduit passing through the crust so as to melt a hole in the crust about the outer periphery of the conduit and permit trapped hydrogen sulphide gas to pass upward therethrough;
   b. venting the hydrogen sulphide gas and other gases contained within the area above the crust through a conduit having a first end in fluid communication with the area above the crust and a second end in fluid communication with the outside of the vessel;
   c. applying a source of heat to the sulphur while the second end of the vent conduit is in fluid communication with the atmosphere; and
   d. unloading the sulphur through an unloading valve positioned on the bottom of the vessel.

* * * * *